United States Patent [19]

Van Luit

[11] 4,294,498

[45] Oct. 13, 1981

[54] WALL CABINET AND METHOD OF MAKING

[76] Inventor: Richard D. Van Luit, 189 Manning Dr., Berea, Ohio 44017

[21] Appl. No.: 85,691

[22] Filed: Oct. 17, 1979

[51] Int. Cl.³ .................. A47B 67/02; A47F 5/08; E05D 7/00

[52] U.S. Cl. .................. 312/245; 312/138 R; 312/242; 312/214; 49/397; 49/501; 16/135

[58] Field of Search ............. 312/138 R, 138 A, 214, 312/242, 245; 16/130, 135 R; 49/397, 501

[56] References Cited

U.S. PATENT DOCUMENTS

| | | |
|---|---|---|
| 2,349,802 | 5/1944 | McKnight . |
| 2,520,236 | 8/1950 | Carver . |
| 2,588,684 | 3/1952 | Archer . |
| 3,144,495 | 8/1964 | Makowski . |
| 3,298,764 | 1/1967 | Goldfarb .................. 312/204 |
| 3,311,683 | 3/1967 | Alesi, Jr. et al. .................. 264/92 |
| 3,314,741 | 4/1967 | Lilner .................. 312/242 |
| 3,335,892 | 8/1967 | Hildreth . |
| 3,411,653 | 11/1968 | Pearce .................. 16/135 |
| 3,758,184 | 9/1973 | Steinkam et al. .................. 312/245 |
| 3,835,660 | 9/1974 | Franck .................. 312/214 |
| 3,935,358 | 1/1976 | Wyeth et al. .................. 428/166 |
| 4,134,625 | 1/1974 | Palka .................. 312/245 |

*Primary Examiner*—Victor N. Sakran
*Attorney, Agent, or Firm*—Meyer, Tilberry & Body

[57] ABSTRACT

A wall cabinet and method for constructing the same is disclosed wherein vacuum formed, heat fusible polymeric sheet material is used to provide a one-piece body portion and a sealed, hollow door portion. The body portion is provided with an integral mounting flange including perpendicularly extending hinge leaves for pivotal mounting of the door portion. Construction of the hollow, sealed door portion enables two separate sheets of polymeric material to be vacuum formed simultaneously and bonded together along a peripheral seam having a thickness substantially less than two sheets in a manner not distracting from the appearance of the door. Assembly of the body portion and door portion is provided by threading studs into the hinge leaves through vertically opposed corners of one side of the door panel. A latching mechanism is provided between the mounting flange of the body portion and the inside surface of the door panel.

7 Claims, 10 Drawing Figures

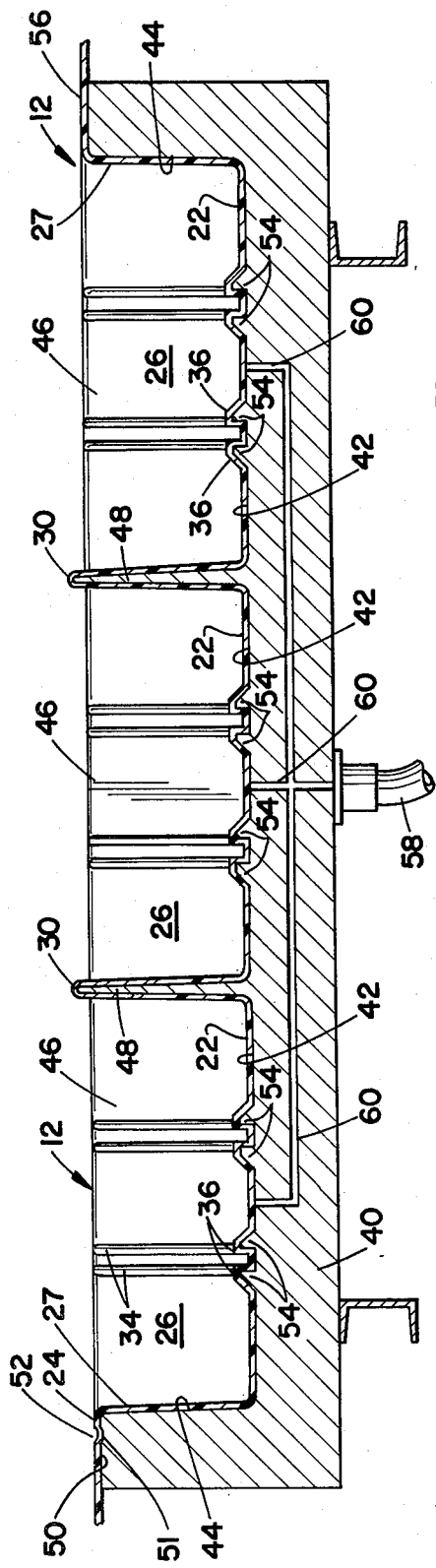

WALL CABINET AND METHOD OF MAKING

BACKGROUND OF THE INVENTION

The present invention relates to a wall cabinet for storage of articles therein and, more particularly, to a vacuum formed, heat fusible sheet material cabinet structure having a unitary body portion and a sealed, hollow door pivotally secured to the body portion.

There exists a large variety of wall cabinets for selection by consumers to serve numerous purposes, such as medicine cabinets, vanities and storage. These wall cabinets mount either on or in a wall of a building and may be constructed of wood, metal or plastic. A consumer, upon considering acquisition of such a wall cabinet, is primarily concerned with looks, weight, structural integrity and price of the unit. It is well known that in recent years plastic materials have been used in construction of an increasing number of articles for consumer use, including wall cabinets. The increasing use of plastics, more particularly polymeric compositions, is a result of the increase in cost of raw materials, such as steel and wood, and the costs of machinery and labor involved in manufacturing articles from the heretofore more conventional materials. The use of plastics results in reducing the weight of a cabinet and thus facilitates handling and installing thereof. At the same time, however, structural integrity is a problem with plastic materials, and previous plastic cabinet constructions and the manufacturing costs in connection with molds and dies for forming cabinet parts and assembly procedures for the parts have not enabled providing a low cost plastic cabinet without sacrificing aesthetics and/or structural integrity.

More particularly with regard to previous efforts to produce plastic wall cabinets, one-piece cabinet bodies such as shown in U.S. Pat. No. 3,314,741 to Litner have been produced by deep drawing plastic sheet material or injection molding. While a light weight cabinet body can be produced in this manner, the cost of die components for injection molding or deep drawing are extremely expensive, and it is difficult to mold or die shape plastic sheet material free of surface defects which detract from the appearance of the end product. Moreover, the provision of such a cabinet body with a door or closure requires the use of hinge components suitably secured to the door and cabinet body, thus increasing the component parts to be assembled to complete the cabinet and the time required to complete the assembly, all of which further increase the cost of the cabinet unit. While the provision of hinge components integral with injection molded cabinet body and door components, such as shown in U.S. Pat. No. 3,298,764 to Goldfarb, may reduce the assembly time insofar as the cabinet body and door are concerned, such integral hinge structures will further increase the cost of the molds for the body and door components and will require the reasonably accurate boring of the aligned pin openings in the hinge components following the molding operation, thus offsetting the savings and assembly time.

With further regard to previous plastic wall cabinet constructions, the door or closure components thereof have not been constructed so as to promote all of the desired characteristics mentioned above, namely an attractive appearance, low manufacturing and assembly costs, light weight construction and structural integrity. In this respect, for example, the provision of a door frame and mirror assembly such as shown in the patent to Goldfarb is expensive and produces a heavy door component which imposes considerable stress on the plastic material of the cabinet body, hinges and door frame during opening and closing of the door. Accordingly, a relatively heavy plastic construction for the walls of the cabinet body and the hinge components is required to minimize the potential breakage or distortion of the plastic material as a result of the imposition of such forces. Such a heavy construction of course increases the cost of the end product without achieving the desired light weight construction. A planar cabinet door, such as that suggested by the disclosure of the patent to Litner, could be light weight if made of plastic. However, such a planar door would more than likely lack structural integrity as a result of flexibility thereof and would provide a less than desirable attractiveness.

The best combination of aesthetics, lightness of weight and structural integrity for a cabinet door would be provided by a hollow door construction comprised of front and back walls, one or both of which would be contoured for purposes of aesthetics and structural integrity, and which walls would be suitably interconnected with one another about the periphery of the door. A number of different methods could be employed to construct such a hollow door. In this respect, for example, two plastic sheets could be preformed by molding or die shaping to provide pan-shaped components having telescopically interengaging flanges which would be suitably bonded to one another. Production of a door in this manner would be extremely expensive in light of the cost of molds or dies for forming the wall components and/or the time and effort required to form and then secure the components together. Additionally, as pointed out hereinabove, injection molding and die shaping can produce defects in the surface of the plastic material. It is also well known to produce hollow plastic objects by introducing plastic sheets between contoured molds and blowing or drawing the sheets into contact therewith while peripherally bonding the sheets laterally adjacent the juncture of the mold cavities. While the molds and equipment for such vacuum or blow shaping is less expensive than injection molding or die shaping equipment, whereby production by vacuum or blow molding would be more economical, the latter methods produce a laterally extending seam in the area of juncture between the plastic sheets. Such a laterally projecting seam would be visible about the periphery of a cabinet door produced in this manner, and the time and effort required to finish the seam after forming the sheets in order to produce an acceptable appearance in the seam area would offset the savings achieved by producing the hollow door in this manner. Furthermore, efforts to minimize the unattractive appearance of the seam such as by removing the laterally projecting portions of the plastic sheets cannot, with reasonable efforts, mask the existence of the seam and, more importantly, result in weakening the bonded juncture between the sheets and thus the structural integrity of the hollow panel. It will be appreciated in connection with a light weight plastic cabinet door which is repeatedly opened and closed that flexure of the plastic material would promote separation of the sheets in the seam area therebetween.

SUMMARY OF THE INVENTION

The present invention provides an improved plastic wall cabinet which is of light construction and is economical to produce and which additionally has structural integrity and a pleasing visual appearance. These attributes are achieved by a construction and method of construction which enables minimizing material and production equipment costs as well as production time while optimizing aesthetics and providing structural integrity against breakage or damage during use of the cabinet.

In accordance with a preferred embodiment of the invention, a wall cabinet is constructed with a unitary plastic sheet body portion and a hollow door panel pivotally connected to the body portion by means of studs extending through hinge leaves integral with the body portion and into openings in the door. The body portion and door are vacuum formed, thus minimizing the cost of forming apparatus. The body portion may include both stationary shelves integrally formed therewith and retaining structures for removable shelves to be supported therein. Further, the body portion includes an integral planar flange surrounding the open side thereof for securing the wall cabinet to a wall or frame structure, and integral planar hinge leaves extending outwardly from the mounting flange to support the cabinet door.

The door panel for the wall cabinet is constructed by vacuum forming two adjacent heat fusible plastic sheets. The vacuum forming of the door in accordance with the present invention results in a hollow, light weight door panel having the bonded juncture between the sheets arranged to provide the necessary structural integrity therebetween while avoiding visible exposure of the line of juncture and avoiding any finishing operations beyond trimming excess material from the door following the vacuum forming operation. More particularly in this respect, the vacuum forming provides for the primary lines of juncture between the sheets to be in planes extending rearwardly of the door about the periphery thereof, enabling a long bond line in the rearward direction for structural integrity. Additionally, the rearward direction of the bond line enables trimming the bonded sheets along a cut line in a plane parallel to the outer and inner walls of the door and adjacent the inner wall, whereby the cut edges face rearwardly of the door and are not visible from the front or side of the cabinet when the door is mounted on the body portion thereof.

In accordance with the preferred embodiment of the invention, the door panel is readily mounted on the body portion of the wall cabinet by inserting threaded studs through the opposed hinge leaves integrally formed on the body portion and into openings provided in vertically opposed corners of the door panel. The resulting wall cabinet is both aesthetically pleasing and structurally sound for the purposes intended, and is extremely economical to produce due to the materials and production methods used, the unique construction of component parts, and minimal assembly time and labor.

A primary object of the present invention is to provide an improved cabinet for mounting on or in a wall structure.

Another object of the present invention is to provide an improved wall cabinet having a one-piece vacuum formed plastic sheet body portion which includes integral shelves or partitions, a wall mounting flange and hinge leaves.

Yet another object of the present invention is to provide an improved hollow door for a wall cabinet and which door is vacuum formed from two juxtapositioned thermoplastic sheets to provide a light weight door having structural integrity and a disposition of the line of juncture of bonding between the sheets which promotes an attractive appearance.

Still another object of the present invention is to provide an improved wall cabinet of the foregoing character in which a hollow door panel is pivotally connected to a one-piece plastic sheet body portion by fasteners extending through planar hinge leaves integral with the body and into openings for the fasteners in opposed walls of the hollow door.

Another object of the present invention is to provide an improved wall cabinet having component parts which are economical to manufacture, which are of a minimum in number, and which are adapted to be easily and quickly assembled, and which when assembled provide a desirable aesthetic quality and structural integrity for the cabinet.

A further object is the provision of a method which enables the production of a light weight, inexpensive wall cabinet having structural integrity and desirable aesthetic characteristics.

Still another object of the present invention is to provide a method by which the production and assembly of component parts of a wall cabinet is more economical than heretofore possible.

Yet another object of the present invention is to provide an improved method of forming a hollow plastic door for a wall cabinet to promote economical production, structural integrity and aesthetic characteristics in association thereof with the cabinet body.

BRIEF DESCRIPTION OF THE DRAWINGS

The invention may take physical form in a variety of parts and arrangements of parts, preferred embodiments of which will be described in the following specification and are illustrated in the accompanying drawings which form a part hereof and wherein:

FIG. 3 is a cross-sectional view illustrating the vacuum forming mold for the body portion of the cabinet and showing the vacuum forming of the body portion;

FIG. 4 is a perspective view of the one-piece body portion of the wall cabinet resulting from the forming operation illustrated in FIG. 3;

DETAILED DESCRIPTION OF THE PREFERRED EMBODIMENTS

Figure 1:
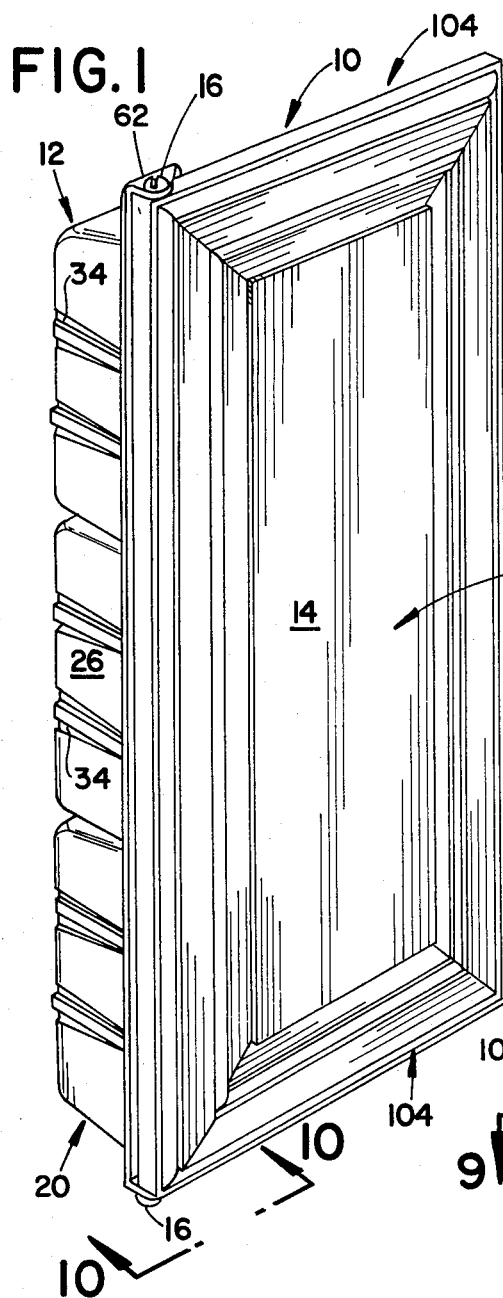
FIG. 1 is a perspective view of a wall cabinet constructed in accordance with the present invention with the door panel closed.
Figure 2:
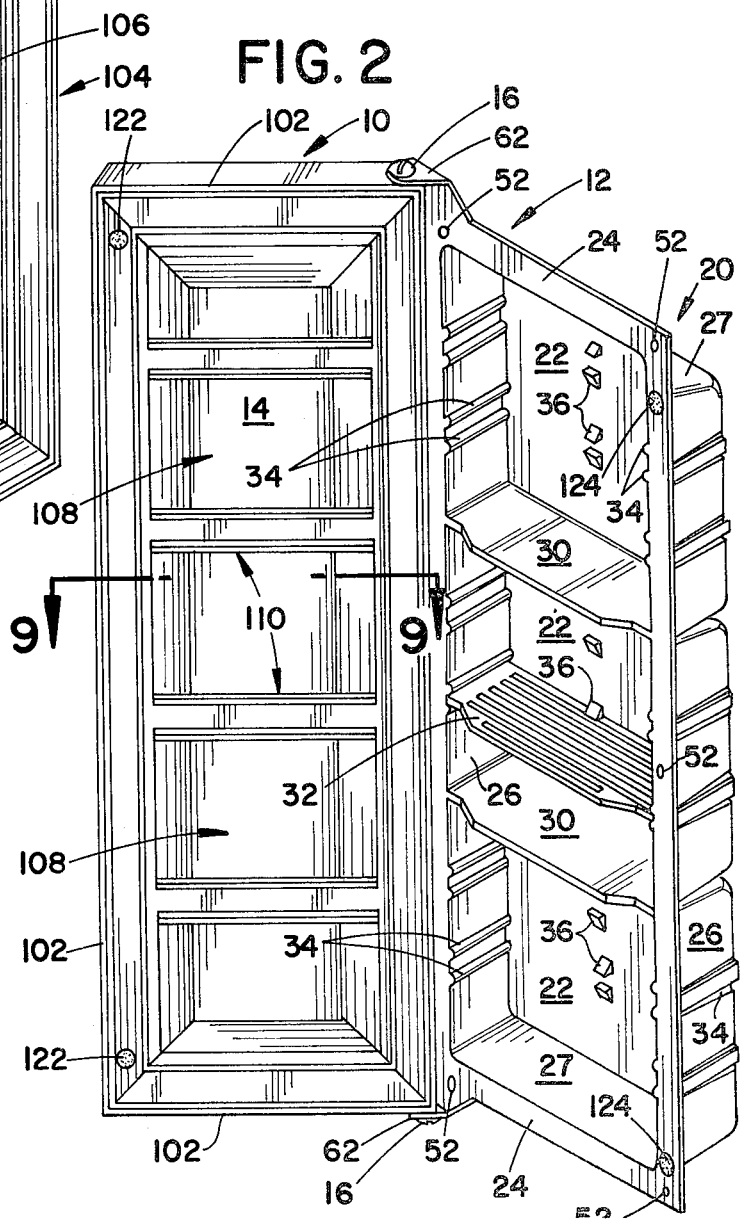
FIG. 2 is a perspective view of the wall cabinet as shown in FIG. 1, with the door panel opened.

Referring now to the drawings wherein the showings are for the purpose of illustrating preferred embodiments of the invention only and not for the purpose of limiting the invention, FIG. 1 shows a wall cabinet 10 having a one-piece body portion 12 and a hollow door panel 14 which is pivotally connected to the body portion by bolts 16. Body portion 12 is vacuum formed as described hereinafter and, as seen in FIGS. 2 and 4, the body portion is in the form of a partitioned rectangular pan 20 having generally planar back wall panels 22, a peripherally continuous mounting flange 24, opposed pairs of side wall panels 26, top and bottom walls 27 and partitions 30. It will be appreciated that partitions 30 provide permanent shelves for the cabinet. In addition to the permanent shelves, body portion 12 may be provided with supports for one or more removable shelves 31. More particularly, support of the removable shelves can be provided by upper and lower support tracks 34 formed integral with opposed side walls 26, and centrally located guides 36 integral with back panels 22.

Body portion 12 is vacuum formed as depicted in FIG. 3. In this respect, a vacuum mold 40 is provided having a configuration corresponding to the desired shape of the body portion and thus, in accordance with the disclosed embodiment, has a mold cavity providing back wall portions 42, top and bottom wall portions 44, side wall portions 46 and cross walls or partitions 48. It will be appreciated that cavity walls 42, 44, 46 and 48 correspond, respectively, to walls 22, 27, 26 and 30 of body portion 12. A top surface 50 of mold 40 provides a flat area completely surrounding the mold cavity for forming peripheral mounting flange 24 of the body portion. A number of indentations 51 are provided in top surface 50 for the purpose of causing dimples 52 to occur in peripheral flange 24, as seen in FIG. 4, for reasons to be explained hereinafter. The mold cavity is further provided with projections 54 on side walls 46 and back walls 42 for the provision of support tracks 34 and guides 36, respectively, in the finished body portion 12. The intersections between the mold cavity walls and projections are radiused as is conventional in the art to assist in the vacuum forming operations.

In FIG. 3, the plastic sheet for forming body portion 12 is indicated by numeral 56, and it will be appreciated that the sheet is initially heated to the vacuum forming temperature therefor and is then laid across the open top of the vacuum mold. As is conventional in vacuum forming thermoplastics, the air trapped within the mold cavity by the overlying thermoplastic sheet is evacuated by means of a suitable pump (not shown) through tube 58 at the bottom of the mold and passages 60 connecting the lowest points of the mold cavity with tube 58. As the air within the mold cavity is withdrawn through tube 58, the heated thermoplastic sheet is drawn into the cavity and into contact with walls 42, 44, 46 and 48 and projections 54. As is known in the art of vacuum forming of thermoplastics, mold 40 is cooled such as by flowing water through coolant passageways therein, not shown in FIG. 3, separate from passages 60. As a result of the cooling liquid flow through the mold, thermoplastic sheet 56 sets in the shape of the mold cavity after a relatively short period of time. Once the thermoplastic sheet has set, the evacuation of air from the mold cavity is stopped, body portion 12 is removed from mold 40 and the peripheral portion of sheet 56 is trimmed to provide the desired shape and width of the mounting flange 24 and to provide door hinge leaves 62 which at this time are of course coplanar with flange 24. The thermoplastic in the area of each hinge leaf 62 is then heated to the appropriate temperature and the outer portions thereof are bent so as to extend forwardly perpendicularly to peripheral flange 24, as shown in FIG. 4. The distance between upright hinge leaves 62 corresponds to the length of door panel 14. Openings for hinge bolts 16 can be provided in the hinge leaves either before or after bending thereof.

Figure 5:
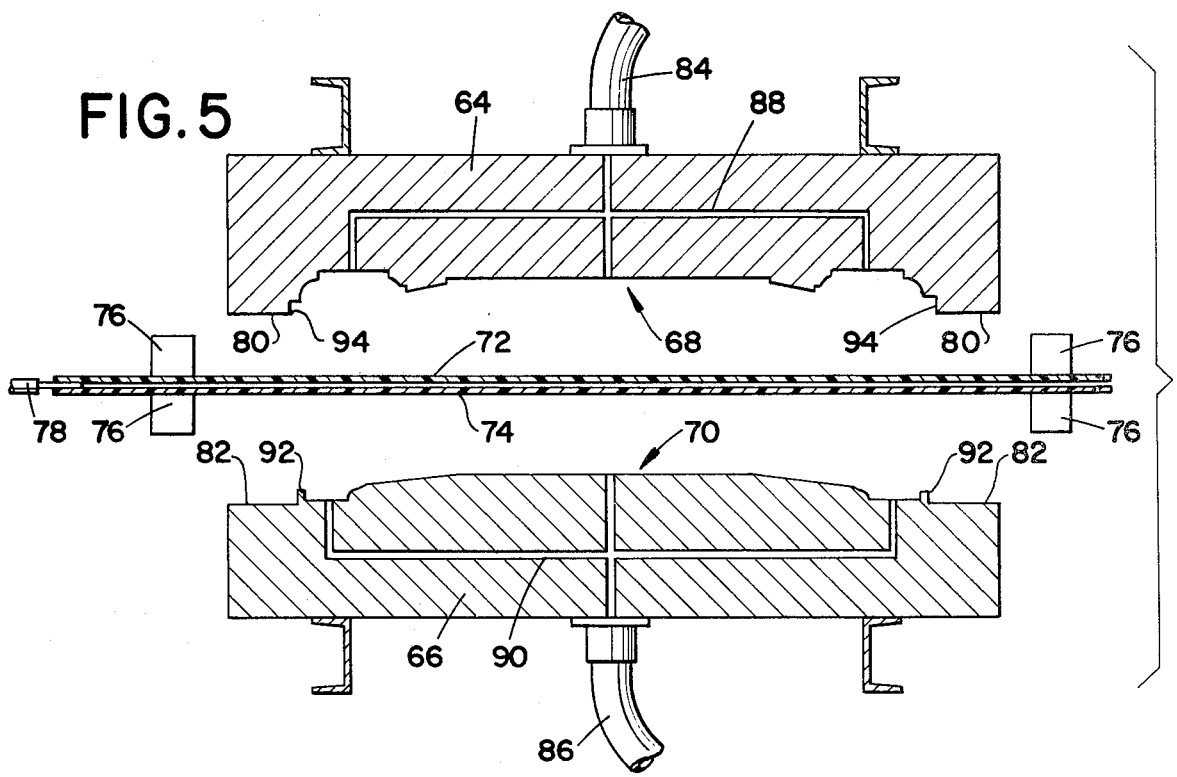
FIG. 5 is a cross-sectional view of vacuum molding apparatus for use in forming the door panel of the wall cabinet and illustrating conditions at the beginning of a forming operation.

Door panel 14 is constructed from two sheets of thermoplastic material which are simultaneously vacuum formed and fused together peripherally to form a hollow panel. The structure and production of door panel 14 will be best understood with reference to FIGS. 5-9, wherein FIG. 5 shows upper and lower vacuum molds 64 and 66, respectively. Mold 64 includes a mold section 68 having a contour corresponding to the desired cross-sectional shape of the outside wall of door panel 14, and mold 66 includes a mold section 70 having a contour corresponding to the desired shape of the inside wall of door panel 14. Molds 64 and 66 are mounted within a suitable mold press mechanism by which relative movement is provided between the molds toward and away from one another.

Figure 6:
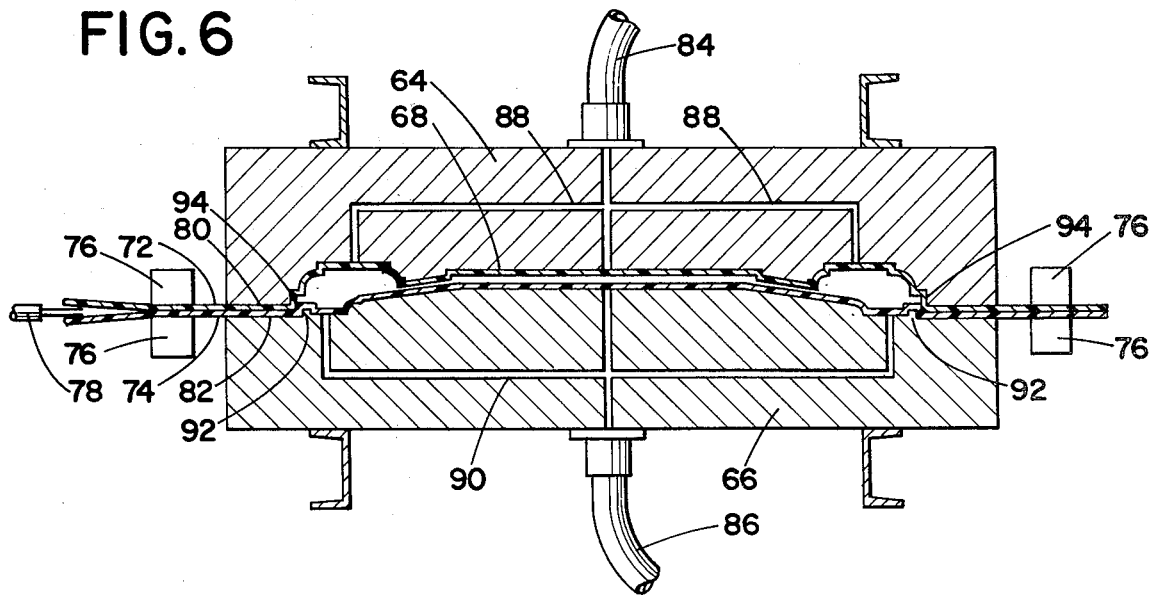
FIG. 6 is a cross-sectional view of the vacuum forming apparatus shown in FIG. 5 illustrating the conditions immediately upon vacuum forming.

As seen in FIG. 5, two thermoplastic material sheets 72 and 74 are supported in face-to-face relationship by clamping mechanisms 76. Pressurized air is introduced between the sheets through a tube 78 for the purpose of maintaining separation between the sheets while the latter are heated prior to vacuum forming. The thermoplastic sheets are heated to the temperature of fusion for the plastic material thereof and are then positioned between upper and lower molds 64 and 66. Molds 64 and 66 are then moved toward one another by means of operation of the press mechanism (not shown) so that peripheral surface 80 of mold 64 and peripheral surface 82 of mold 66 engage and hold the thermoplastic sheets therebetween, as shown in FIG. 6. After the molds so engage the sheets, the air between each sheet and the corresponding mold section is evacuated by the operation of a vacuum pump, not shown, through tubes 84 and 86 and passages 88 and 90, whereby thermoplastic sheets 72 and 74 are drawn into engagement with mold sections 68 and 70, respectively.

Figure 7:
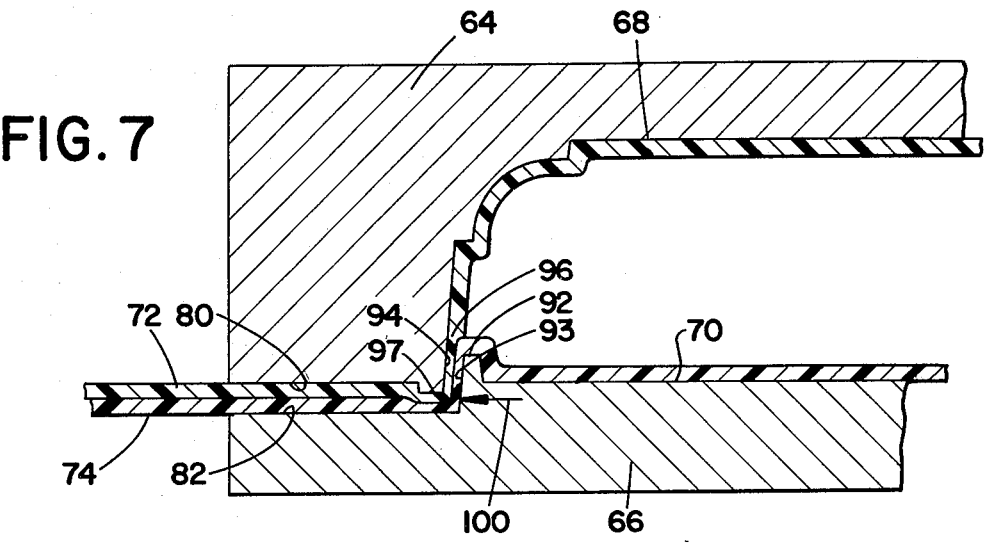
FIG. 7 is an enlarged cross-sectional view of a portion of the door panel and mold sections shown in FIG. 6 illustrating the line of bonding along the peripheral edge of the door.

Importantly in accordance with the present invention, and as best seen in FIG. 7, mold section 70 of mold 66 includes an upstanding flange 92 which extends peripherally about the mold section and has an outer wall 93 parallel to a downwardly extending wall 94 surrounding the periphery of mold section 68 of mold 64. Peripheral wall 94 is spaced outwardly from peripheral wall 93 a distance less than the thickness of the two sheets 72 and 74. Accordingly, when the molds are brought together, as shown in FIG. 6, the portions of the sheets between walls 93 and 94 are subjected to pressure and a reduction in thickness, as seen in FIG. 7, to thermally bond the sheets along a peripherally continuous line of juncture or seam 96. While the sheets in the area of the seam are shown with a line therebetween, it will be appreciated that the heat and pressure fuses the sheets together in this area. Preferably, peripheral wall 94 of mold section 68 of mold 64 terminates in a peripherally continuous downwardly extending flange 97 which, as seen in FIG. 7, has a bottom surface spaced slightly below peripheral surface 80 of mold 64. This provides for the portion of plastic sheets 72 and 74 laterally outwardly adjacent the seam area to be subjected to pressure and a reduction in thickness in the direction toward surface 82 of mold 66, and for the plastic sheets to also be thermally bonded in the latter area. This assures continuity of the bonded seam downwardly and outwardly as seen in FIG. 7 for the purpose set forth hereinafter. With respect to the orientation of the component parts in FIG. 7, the vertical length of peripheral wall 93 provides for the vertical length of the thermally bonded seam 96 to be sufficient to prevent any separation of the sheets from one another upon completion of the door and use thereof in connection with the cabinet body. As mentioned hereinabove, mold section 68 of mold 64 corresponds to the front wall of the door panel 14 and mold section 70 of mold 66 corresponds to the back wall of the door panel. Accordingly, it will be appreciated from FIG. 7 that the line of juncture or seam line 96 extends in the direction between the front and back walls of the door. This directional orientation of the line of juncture advantageously enables providing for an adequate area of bond between the sheets peripherally of the door panel and, as set forth more fully hereinafter, trimming of the vacuum formed door panel in a manner which avoids exposure of the trimmed edge when the door panel is mounted on the cabinet body.

Figure 8:
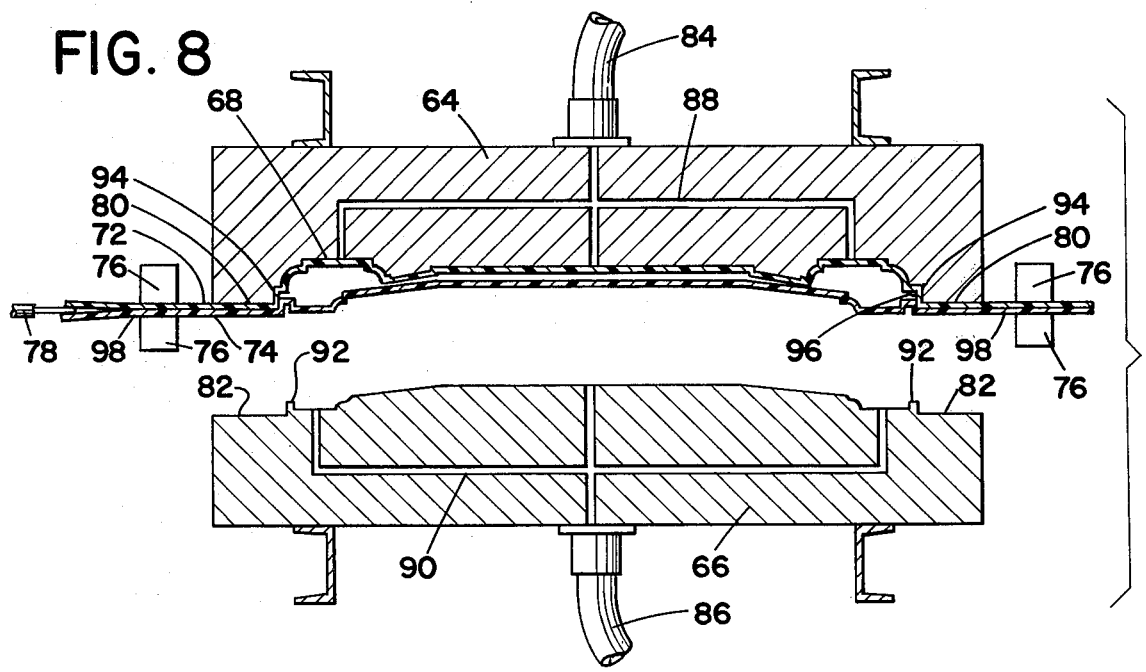
FIG. 8 is a cross-sectional view of the vacuum forming apparatus shown in FIGS. 5 and 6 and illustrating the conditions after the door panel has been vacuum formed.
Figure 9:
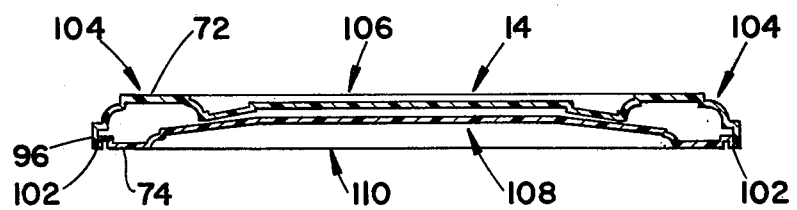
FIG. 9 is a cross-sectional view of the door panel taken along line 9—9 of FIG. 2 illustrating the completed door panel after trimming; and, FIG. 10 is a partial cross-sectional view looking in the direction of line 10—10 of FIG. 1 and illustrating the attachment of the door panel to the body portion.

Following the vacuum forming of sheets 72 and 74 in the foregoing manner and the setting of the plastic material such as by the flow of cooling water through coolant passageways in molds 64 and 66, not shown, the molds are separated to the positions shown in FIG. 8 to enable separation of the vacuum formed panel therefrom. The excess plastic sheet material 98 which extends peripherally about the vacuum formed panel is then removed so as to provide for the peripheral edge of the door panel to be configured as shown in FIG. 9 of the drawing. More particularly in this respect, and with reference again to FIG. 7, excess material 98 is removed by cutting the bonded portions of the plastic sheets along a cut line in the direction of arrow 100, which cut line provides the door panel with a trimmed edge 102 extending peripherally thereabout and facing rearwardly of the door, as shown in FIGS. 2 and 9. Preferably, the plane of the cut line is as close as possible to the rearwardly extending side edge of the door as would be defined by the plane of the lower surface of flange 97 of mold 64 in FIG. 7. The provision of downwardly extending flange 97 on mold 64 advantageously enables optimizing the length of the seam line 96 in the direction rearwardly of the door. Further, continuity of the thermal bond into the area between the plastic sheets laterally outwardly of seam line 96 assures the desired thermal bond being achieved throughout the length of seam 96 in the direction rearwardly of the door when the excess material 98 is severed from the door panel as described above. After removal of material 98, the door panel is completed by providing hinge bolt openings in vertically opposed corners thereof and by which the door is pivotally mounted on body portion 12, as set forth more fully hereinafter.

It will be appreciated from the foregoing description of the vacuum forming of the door panel, and from FIGS. 1, 2 and 9 of the drawing, the door panel 14 has an outer or front wall defined by sheet 72 and an inner or rear wall defined by sheet 74. It will be further appreciated that the mold sections of the vacuum forming molds can be contoured to provide a wide variety of contoured configurations for the front and rear walls of the door panel. Preferably, the contours chosen provided for shaping the plastic sheets in a manner which strengthens the door panel against flexure and, at the same time, provides a pleasing appearance. These characteristics are achieved in the embodiment disclosed herein by providing for the peripheral portion of the door panel designated generally by reference numeral 104 to be configured to simulate contoured wood framing having curved portions in cross-section which serve to rigidify the plastic sheet material. Further, the central portion 106 of the front wall of the door panel is generally planar to simulate a wood panel and has inwardly offset portions about the periphery thereof which further rigidifies the door panel. Still further, the inside wall of the door panel in the embodiment illustrated is provided with a plurality of recesses 108 separated by laterally extending ribs 110 which further rigidify the door panel. It will be appreciated, of course, that other cross-sectional configurations can readily be provided to serve the same aesthetic and rigidifying purposes.

Figure 10:
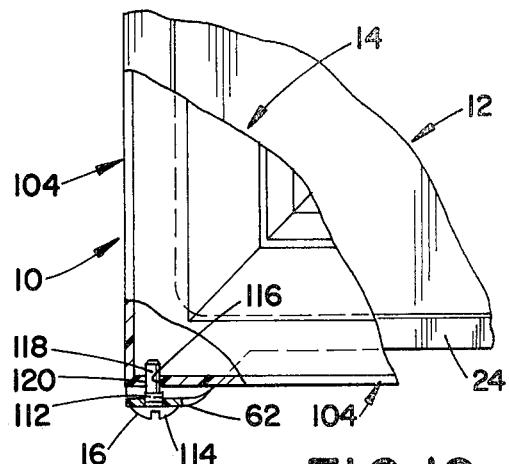

As shown in FIGS. 1 and 2, door panel 14 is pivotally mounted on body portion 12, and the manner in which such mounting is preferably achieved is illustrated in detail in FIG. 10 with regard to the bottom left hand corner of the door. In this respect, hinge bolt 16 has a threaded shank 112 and a head portion 114, and shank 112 is threaded into the opening 116 provided in hinge leaf 62 therefor. Opening 116 is of a diameter which provides for the threads on the shank to be self-tapping when the bolt is screwed into the opening. Preferably, only the portion of shank 112 immediately underlying head 114 is threaded. The remainder of shank 112 preferably is smooth, as indicated by numeral 118, and this portion of the shank extends into opening 120 provided in the bottom end wall of the door panel adjacent the left hand corner thereof. It will be appreciated that the upper left hand corner of door panel 14 is likewise pivotally interconnected with body portion 12 through the corresponding hinge leaf 62 and hinge bolt 16. Once hinge bolts 16 have been inserted through hinge left openings 116 and door panel openings 120, they are screwed into openings 116 until heads 114 engage the outer surface of the corresponding hinge leaf, thus to complete the assembly. While any suitable arrangement may be used to releaseably latch door panel 14 closed with respect to body portion 14, such latching is preferably achieved by well known cooperable VELCRO components 122 and 124 respectively on the door panel and body portion, as shown in FIG. 2.

When the cabinet 10 is completed, it is adapted to be readily mounted in a wall opening by means of nails or screws forced through dimples 52 which advantageously serve as locators for such fasteners. It will be appreciated that mounting flange 24 overlies the wall peripherally of the opening therein and that the fasteners clamp flange 24 against the wall. If the wall does not have an opening therein, such as it would in the case of replacing an existing cabinet, and the wall is not susceptible of being provided with an opening for the cabinet, it will be appreciated that a suitable frame can be constructed and mounted on the wall and cabinet 10 in turn mounted on such frame.

The sheet material used for construction of body portion 12 and door panel 14 can be any one of a number of thermoplastic materials such as, for example, styrene, ABS or polyethylene. Due in particular to its ability to absorb a relatively wide range of shocks, while resisting breakage, the preferred material is high impact polystyrene. The thickness of the material used to produce the various component parts may be of any suitable dimension to accommodate the desired forming operation and a desired rigidity for the cabinet unit. In the embodiment herein disclosed body portion 12 is constructed of high impact polystyrene sheet material having a thickness of 0.125 inch, while door panel 14 is constructed of two sheets of the polystyrene each having a thickness of 0.080 inch. Removable partitions 32 are also preferably vacuum formed and, if so formed, can be polystyrene sheets having a thickness of 0.060 to 0.070 inch. In vacuum forming body portion 12, door panel 14 and removable partitions 32, the polystyrene sheet material is heated to a temperature within the range of 350° F. to 450° F., positioned with respect to the corresponding mold, and the mold is then evacuated by application of a vacuum of 26 inches Hg. In connection with the vacuum forming of door panel 14, molds 64 and 66 are clamped together under pressure within the range of 80-100 pounds per square inch to achieve the material thickness reduction and thermal bond described herein. The air applied through tube 78 between plastic sheets 72 and 74 is at a pressure of approximately five pounds per square inch which is sufficient to maintain separation between the two heated sheets prior to evacuation of the mold. As mentioned herein, molds 40, 64 and 66 are maintained at a relatively constant temperature through water cooling. As a result of the circulation of cooling water in the disclosed embodiment, the temperatures of the molds are maintained at approximately 110° F.

While considerable emphasis has been placed herein on preferred embodiments of the invention and the specific structures and structural interrelationships of the component parts thereof, it will be readily apparent that many embodiments of the invention can be made and that many changes can be made in the embodiments herein illustrated and described without departing from the principles of the invention. Accordingly, it is to be distinctly understood that the foregoing descriptive matter is to be interpreted as merely illustrative of the invention and not as a limitation.

Having thus described the invention, it is claimed:

1. A plastic wall cabinet comprising a body portion of plastic sheet material and having a back wall and top, bottom and side walls integral with and extending forwardly of said back wall to provide said body portion with an open front, mounting flange means including upper and lower planar mounting flanges integral with and extending upwardly and downwardly respectively from said top and bottom walls, said upper and lower mounting flanges having upwardly and downwardly facing terminal edges, respectively, extending laterally between said side walls, said planar mounting flanges having corresponding first ends adjacent one of said side walls, upper and lower hinge leaf means each integral with the corresponding one of said upper and lower terminal edges of said first ends of said mounting flanges, each said hinge leaf means including a laterally narrow planar hinge leaf vertically spaced from the corresponding one of said top and bottom walls and extending horizontally forwardly of the corresponding mounting flange, a hollow door for closing said open front, said hollow door comprising front and back panels of plastic sheet material bonded together to provide a central portion bounded by a peripherally continuous hollow portion including a seam between said panel sheets extending about said hollow portion and rearwardly from said front panel toward said back panel, said panel sheets in the area of said seam having rearwardly facing terminal end edges transverse to said seam, and a hinge pin extending through each said hinge leaf and into said hollow portion of said door to pivotally mount said door on said body portion.

2. The cabinet according to claim 1, wherein said mounting flange means further includes planar mounting flanges integral with and extending laterally outwardly from each said side walls of said body portion coplanar with said upper and lower mounting flanges.

3. Thy cabinet according to claim 2, wherein said mounting flange means is peripherally continuous about said open front of said body portion.

4. The cabinet according to claim 3, wherein said hinge pins are interengaged with the corresponding hinge leaf against separation therefrom.

5. The cabinet according to claim 3, wherein said body portion includes at least one shelf integral therewith and extending between said side walls and said back wall.

6. The cabinet according to claim 5, wherein said side walls of said body portion include integral support means for positioning a removable shelf within said body portion.

7. The cabinet according to claim 6, wherein said hinge pins each include a head and a threaded shank, said head engaging the corresponding hinge leaf, and said shank threadedly interengaging the opening in said corresponding hinge leaf.

* * * * *